United States Patent [19]

Drury et al.

[11] Patent Number: 4,636,851

[45] Date of Patent: Jan. 13, 1987

[54] SIGNAL CODING FOR SECURE TRANSMISSION

[75] Inventors: Gordon M. Drury, Whitechurch; Arthur G. Mason, Andover; Nicolas K. Lodge, Salisbury; Barry A. Flannaghan, Alresford, all of England

[73] Assignee: Independent Broadcasting Authority, London, England

[21] Appl. No.: 568,199

[22] PCT Filed: Apr. 25, 1983

[86] PCT No.: PCT/GB83/00121

§ 371 Date: Dec. 12, 1983

§ 102(e) Date: Dec. 12, 1983

[87] PCT Pub. No.: WO83/03942

PCT Pub. Date: Nov. 10, 1983

[30] Foreign Application Priority Data

Apr. 23, 1982 [GB] United Kingdom ............... 8211826

[51] Int. Cl.[4] .............................................. H04N 7/167
[52] U.S. Cl. ..................................... 358/119; 358/123
[58] Field of Search ............... 358/119, 114, 122, 123, 358/12

[56] References Cited

U.S. PATENT DOCUMENTS 4,070,693 1/1978 Shutterly ...................... 358/122 X
4,335,393 6/1982 Pearson ........................ 358/12 X

FOREIGN PATENT DOCUMENTS 2431809 7/1978 France ........................... 358/114
8102499 9/1981 PCT Int'l Appl. ............. 358/119

Primary Examiner—Stephen C. Buczinski
Assistant Examiner—Linda J. Wallace
Attorney, Agent, or Firm—Laubscher & Laubscher

[57] ABSTRACT

A multiplexed analogue component (MAC) television signal is encrypted for transmission and reception by authorized recipients only by dividing the signal into blocks and reordering the blocks prior to transmission. The signal within each block remains in its original order. Preferably, the signal representing one line of video is split into blocks which are reordered within the line time to cause translation or rotation of analogue components. Alternatively a group of lines may be processed as a group to cause reordering of the analogue components between lines. The preferred arrangement does not split the blocks of analogue signals already present in the MAC signal. The receiver is arranged to receive information regarding the encryption technique with the television signal and to reorder the blocks constituting the received signal whereby to reconstruct the original signal.

5 Claims, 9 Drawing Figures

SIGNAL CODING FOR SECURE TRANSMISSION

BACKGROUND OF THE INVENTION

The present invention relates to apparatus for transmitting an encrypted information signal including an analog component and receiving apparatus for receiving such an encrypted signal and unscrambling it.

The use of earth satellites to radiate information services, including broadcast signals, may require the use of secure coding techniques which in this specification will be called encryption. An example of such a system would be subscription broadcast services, but the techniques to be described later could be suited equally well to any other information distrubtion system where controlled access is required. The issue of licences or other purely administrative means of controlling receivers does not fully guarantee that licencees are the only possible recipients of the signal or information. It is therefore particularly important that a guarantee of privacy be supported by some technical means of restricting access to an exclusive broadcast program or other information source.

The essence of a scrambling or encryption system is that, for the authorized recipient, the guarantee offered is of high integrity, that the hardware involved is simple and inexpensive and program or information reception by unauthorised recipients is both difficult and time consuming.

A number of different techniques exist whose complexity, convenience and cost of implementation vary. These techniques also vary in the degree of security which they afford; for example whether they render broadcast program material totally unintelligible or whether they simply impair the program sufficiently to render it worthless.

For the particular case of broadcast signals, audio, video and text signals can be present singly or in combination. Novel modulation schemes such as the multiplex analog components (MAC) system which is disclosed in our co-pending British application No. 8202622 is one such broadcast signal which has in any one line period three distinct blocks of information namely a digital block and first and second analog blocks containing video information. While it is possible to provide an effective encryption algorithm for the digital block using digital methods it is much more difficult to provide an effective encryption method for the analog portions of the signal because re-ordering of the analog video information in a line is only permissible if done within limits since any wholesale re-ordering affects the signal and noise spectra adversely at the receiver. It is an object of the present invention to provide apparatus for encrypting an information signal including an analog component in such a way that there is effectively no impairment of the received signal due to the encryption.

SUMMARY OF THE INVENTION

The present invention provides apparatus for encrypting an information signal including an analog component comprising means for separating the information signal into blocks, storing each of the blocks in a first order and reading out the stored information in a second order different from the first order.

The present invention further provides receiving apparatus for receiving an encrypted information signal which receiving apparatus includes storage means for storing an incoming encrypted information signal as a plurality of blocks of information and means for reading out the stored information in such a manner as to reconstruct the original signal prior to encryption.

In the case of a MAC signal where there are two distinct blocks of analog components and a separate block of digital signals, it is convenient to treat each analog block as an indivisible whole. Further, it is advantageous to send information regarding the encryption techniques using the digital signal block.

BRIEF DESCRIPTION OF THE FIGURES

In order that the present invention be more readily understood embodiments thereof will now be described by way of example with reference to the accompanying drawings, in which.

DETAILED DESCRIPTION

The main use of the invention is for encrypting the MAC video signal. However, this is but one use of the apparatus and techniques to be disclosed.

Figure 1:
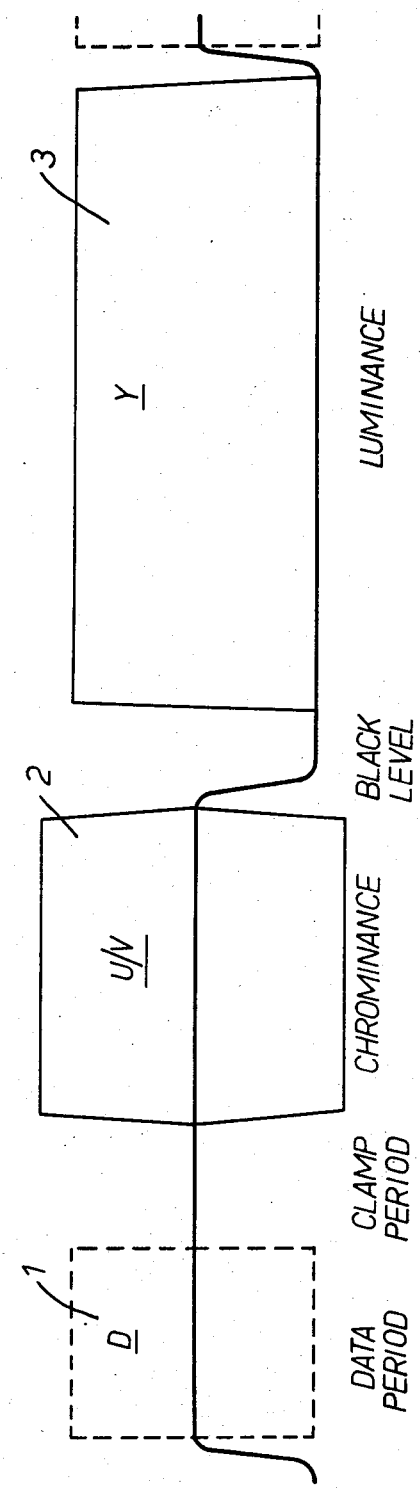
FIG. 1 shows diagrammatically one line of a multiplexed analog component video waveform.

Turning now to FIG. 1, this above diagrammatically a current MAC video waveform which will be seen to comprise a first portion (1) which contains data in digital form, a second portion (2) which contains analog information relating to the video signal, in this case the chrominance, and a further block (3) which contains further analog information which relates to the video signal in this case luminance. There are clear separations between each of the above blocks (1), (2) and (3). Thus, it is convenient to consider these blocks and particularly the blocks containing analog information to be indivisisible and the encryption techniques which will be described in detail will be described in relation to maintaining at the analog components in indivisible blocks.

Figure 2:
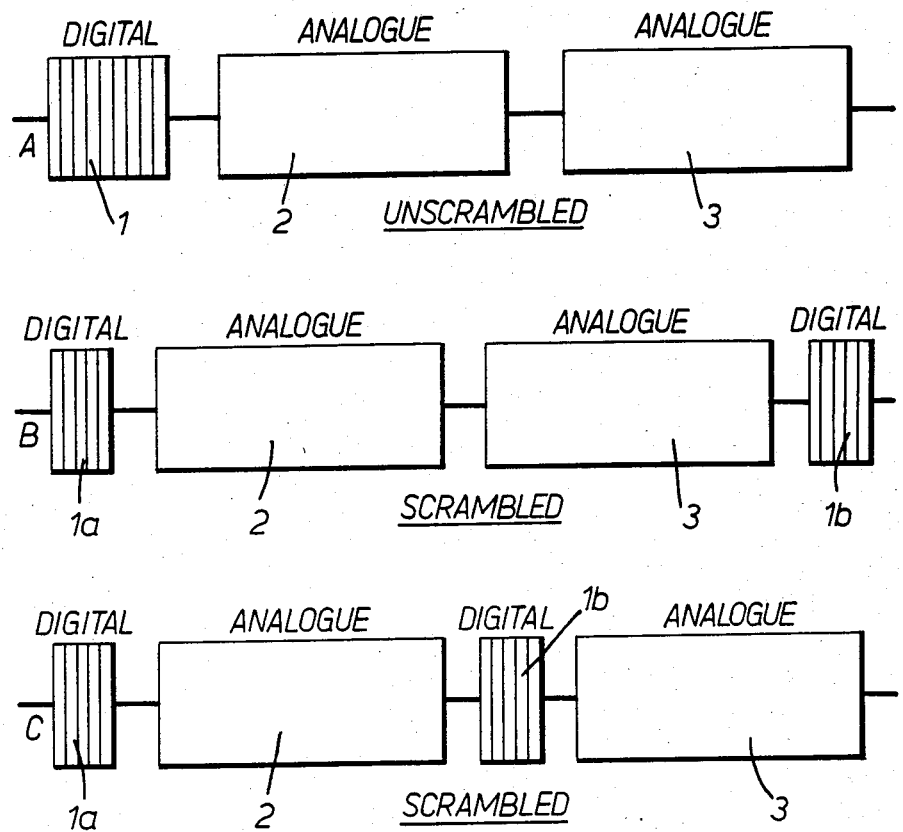
FIG. 2 shows diagrammatically a first encryption techniue.

Turning now to FIG. 2, the MAC waveform is again shown in its original form. In FIG. 2a one method of encrypting this signal would be to split the digital block into two which can be easily done and to insert one portion of the digital block either at the end of the video line as shown in FIG. 2b or in between the analog blocks as shown in FIG. 2c. In either case 2b or 2c, the overall line time is unaltered but there is a translation in time of at least one of the analog blocks which means that if the encrypted signal were received by an unauthorized piece of apparatus the video information would be corrupted.

A further technique which is an extensionn of the technique shown in FIG. 2 is to consider groups of lines wherein there are at least two lines in each group. The digital blocks for each of the lines of a group can be grouped together and sent sequentially and thereafter the analog components can be sent either in their original order or in some other order. In either of the above cases it is convenient if the information required by the receiver in order to unscramble the encrypted signal is contained in the digital information which is retained at the beginning of an encrypted line or group of lines.

If necessary, also, a snyc signal can be contained in the digital information which is retained at the beginning of each line or group of lines to ensure proper generation of line syncs.

Figure 3A:
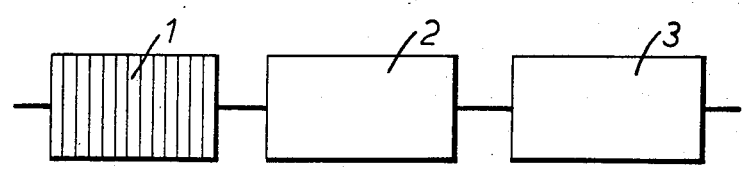
FIG. 3 shows a second encryption technique.
Figure 3B:
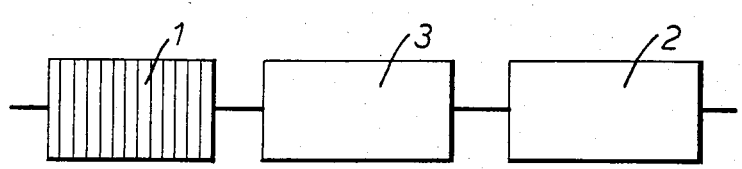
Figure 3C:
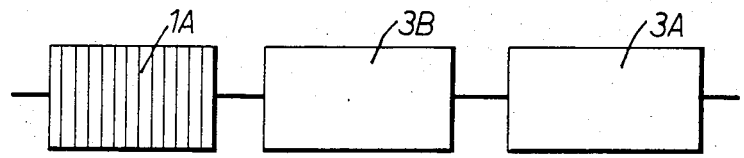
Figure 3C:
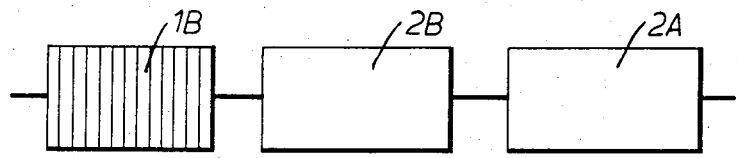

A further technique for encrypting the signal is shown in FIG. 3 where again in FIG. 3a the MAC signal is shown in its un-encrypted form. By using storage techniques it is possible to put the analog block 3 in the position where analog block 2 should be and to put analog block 2 where analog block 3 should be. This is a very simple but convenient technique and is shown in FIG. 3b. FIG. 3c shows a group of lines, in this case, 2 line, A and B, with the luminance and chrominance of the lines in the group being shared between the lines in the group in a different order to that which exists with the lines originally.

A still further method of encrypting the MAC signal is to randomly re-order the video lines but this approach requires more storage at the transmitter and receiver.

Figure 4:
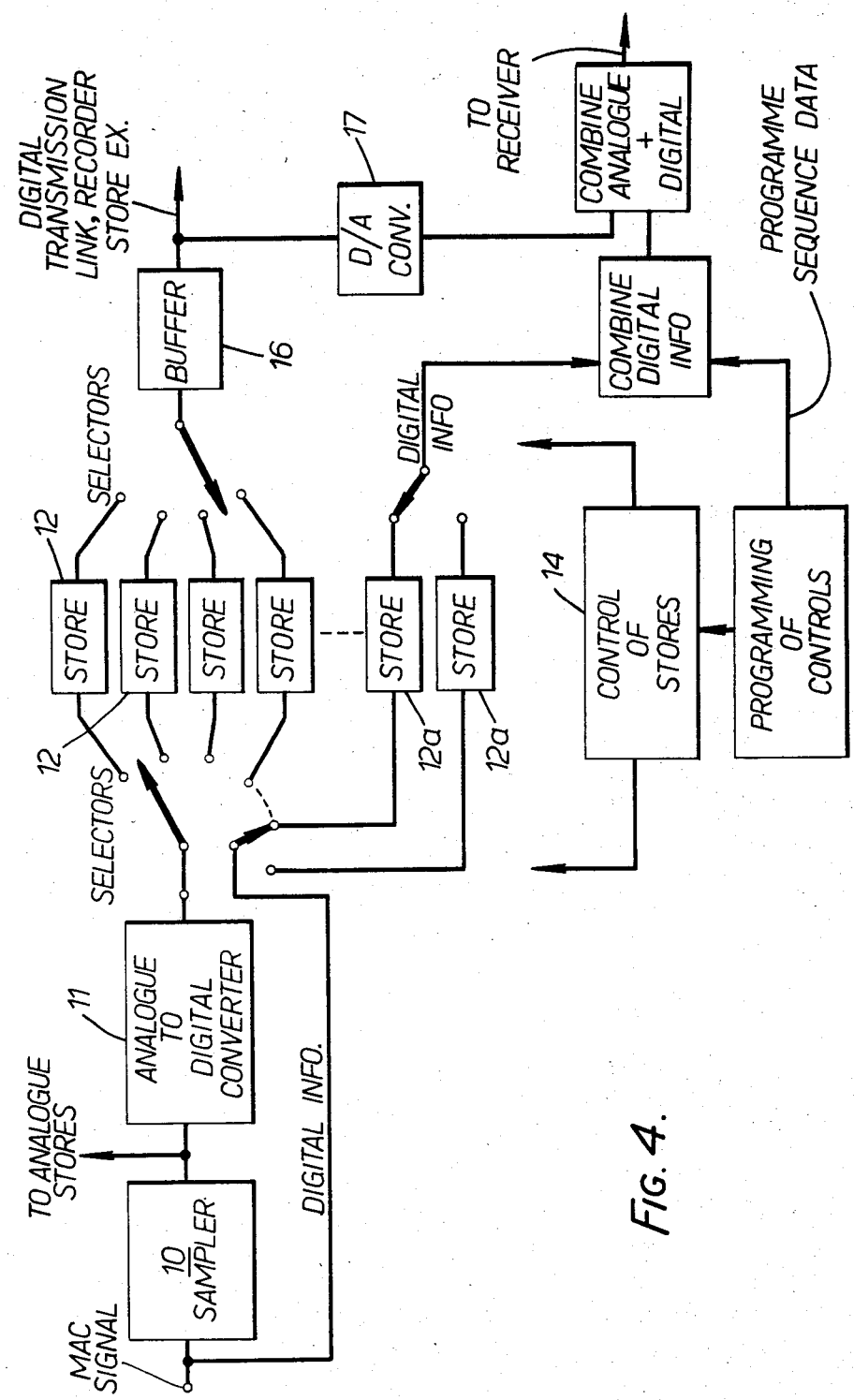
FIG. 4 shows a block diagram of apparatus for encrypting an information signal.

Turning now to FIG. 4, there is shown diagrammatically an arrangement for the encryption of a signal to be transmitted either as a broadcast signal or via a cable or some other communications link to a receiver which may be a recording machine, a computer, or a television receiver. The following description is given on the basis that the processing will be undertaken using digital techinques but it will be understood that identical processing can be undertaken using analog techniques although in the latter case the analog-to-digital and digital-to-analog converters will not probably be necessary.

The incoming information is divided into blocks by a sampling circuit 10 and thereafter any non-digital components are fed to a digital-to-analog conversion circuit 11. The digital components, if any, can be fed directly to a buffer store 11a. The output of the digital-to-analog circuit 11 and the buffer store 11a are then fed to a plurality of stores 12 in a first sequence under the control of a gating circuit 14 controlled by a programming circuit 15. The programming circuit determines which of the encryption schemes is used and can be any one of the above techniques or any other suitable technique. The contents of these stores 12 are read out in a second sequence different to the first so that the read out data is now encrypted. This encrypted data is fed through a buffer 16 to a digital transmission link if desired or to a digital-to-analog circuit 17 and then to an analog transmission link.

The program data contained in the circuit 15 has, of course, to be present at the receiver for the transmission to enable de-encryption of the transmission. This can be done by transmitting the programming data together with the encrypted information signal or else it can be done by using a fixed program and storing the fixed program in the receiver. If the programming data is sent with the encrypted information signal, it is convenient to use the digital information block for the programming data and to position the programming data at such a position in the data block such that it will be decoded by the receiver prior to reception of the encrypted information signal.

Figure 5:
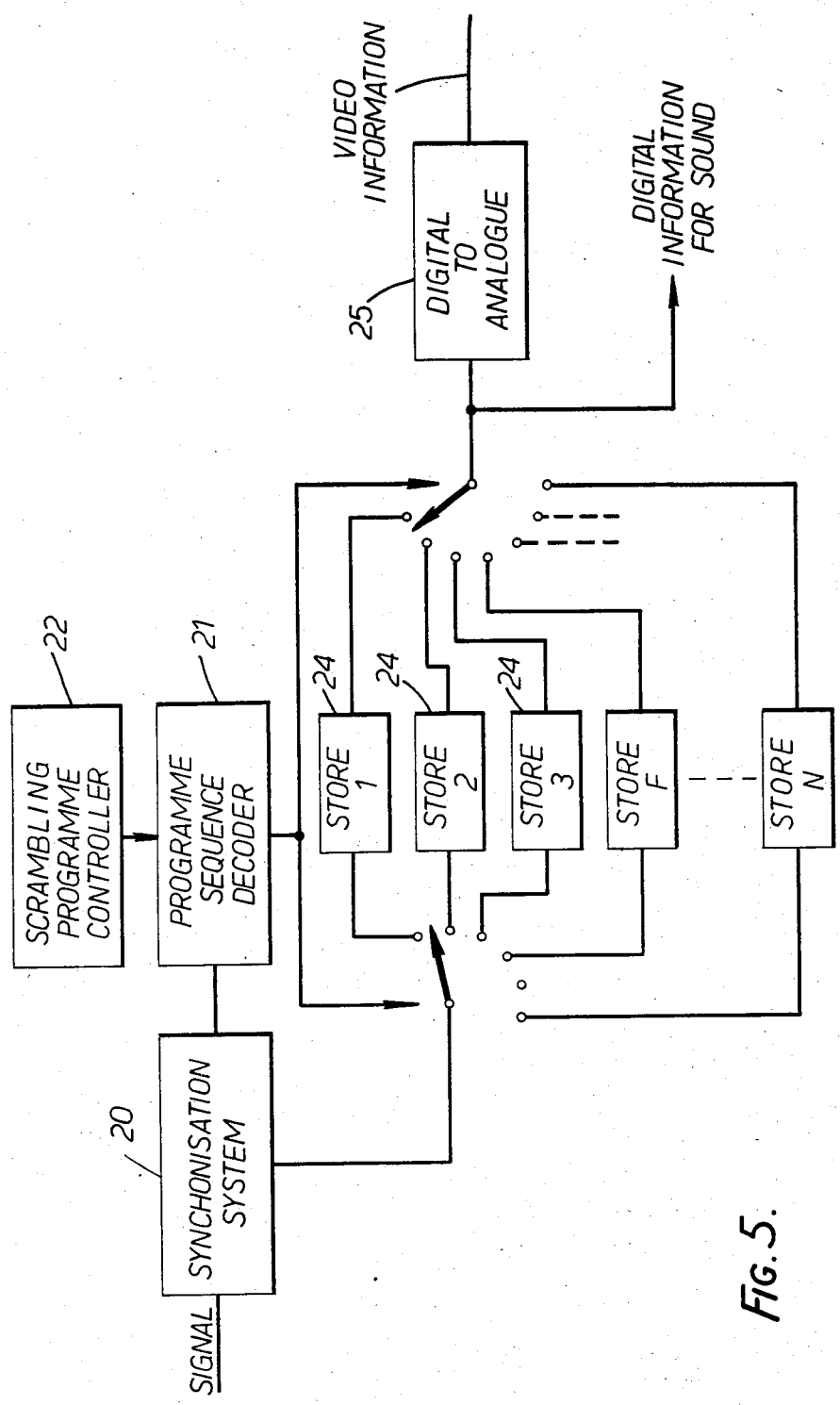
FIG. 5 shows a block diagram of de-scrambling apparatus used in a receiver.

Referring now to FIG. 5, this shows a system whereby the program data for controlling the de-encryption of the transmission is transmitted together with the encrypted data and after reception the programming control data is separated from the other data in a synchronization system 20. One output of the syncrhonization system is fed to an input of a program sequence decoder circuit 21 whose other input is connected to the output of a scrambling programming controller 22. The output of a program sequence decoder 21 is used to get data separated in the synchronization system 20 to a plurality of stores 24 in a particular sequence equivalent to the second sequence at the transmitter and also to control the reading out of the information stored in the stores, the reading out being undertaken in a further sequence equivalent to the first sequence at the transmitter whereby to reconstruct the original form of the information signal. The reconstructed information signal is then fed to a digital-to-analog converter 25 if it is desired to have the information in analog form or directly to digital equipment of a combination thereof.

In the case of MAC, it is necessary to reconstruct both digital and analog signals for use by the receiver.

The above description of FIGS. 4 and 5, described how only the analog blocks contained in a MAC signal are processed but the MAC signal also has a digital block present in each line. The different techniques described in FIGS. 2 and 3 can be complimented in a number of different ways. For example, the digital block need not be stored at all and can be simply latched from the input to the output of FIG. 4 for combination with encrypted analog information. However, as shown in FIG. 4 of the drawings, the digital block of the MAC signal is shown as being split and portions stored in respective additional stores 12a under the control of the circuit 14. After reading out, the information in the stores 12a is combined with the program sequence data from the programming circuit 15 and then sent with the encrypted analog blocks.

FIG. 5 which shows the de-encrypting circuit strips the digital information from the received signal and decodes the program sequence data therefrom. The digital information read out from the stores 24 includes the digital blocks which may include the sound channel.

The above description has been given on the basis that the analog blocks are not sub-divided but it is conceivable in certain circumstances that the analog blocks may themselves be divided and their order within a line altered.

All the above measures are designed as deterrents. It must be recognized that the "key" which solves the encryption is available publicly in the form of a legitimate receiver. Thus, manufacture of these receivers must be secure.

We claim:

1. A method of processing a signal representing a line of a television picture, comprising the steps of
 (a) generating a sampled signal;
 (b) dividing the sampled signal into blocks of information;
 (c) loading said blocks of information in a first order into a plurality of stores whose total capacity is sufficient to store information representing one line; and
 (d) reading out said blocks of information in said stores in a second order different from the first order with the information within one of said blocks when read out being in the same order as when written into a store; thereby to provide an encrypted signal;
 (e) said sampled signal generation comprising the step of processing an input signal to provide multiplexed signals representing digital information, sampled analog chrominance information, and sampled analog luminance information for the complete line, said sample signal division being arranged to divide one of said multiplexed signals into a plurality of portions altering the position in the line of at least one of said portions.

2. Apparatus for receiving an encrypted signal representing a line of a television picture and for reconstructing the original signal, comprising
   (a) means for receiving the encrypted signal;
   (b) means for separating the signal into blocks of information;
   (c) means for writing said blocks of information into a plurality of stores;
   (d) means for reading said blocks of information out of said plurality of stores;
   (e) control means for controlling the reading and writing of said blocks of information to reconstruct the order of the information in the original signal, the information within each block being unaltered throughout; and
   (f) demultiplexing means responsive to the signals stored in said plurality of stores for generating signals representing chrominance information and luminance information for displaying a television picture.

3. Apparatus as defined in claim 2, wherein the encrypted signal contains decoding information relating to the encryption technique for assisting in decoding the encrypted signal, and further comprising means responsive to the decoding information for conditioning the controlling means.

4. Apparatus as defined in claim 3, and further comprising means for receiving additional information for assisting in the decoding of the encrypted signal.

5. Apparatus as defined in claim 3, further comprising a digital to analog converter for converting at least some of the decoded information into an analog signal.

* * * * *